March 7, 1950 — J. M. HAIT — 2,500,030
SINGLE WHOLE FRUIT FEEDER
Filed May 28, 1947 — 3 Sheets-Sheet 1
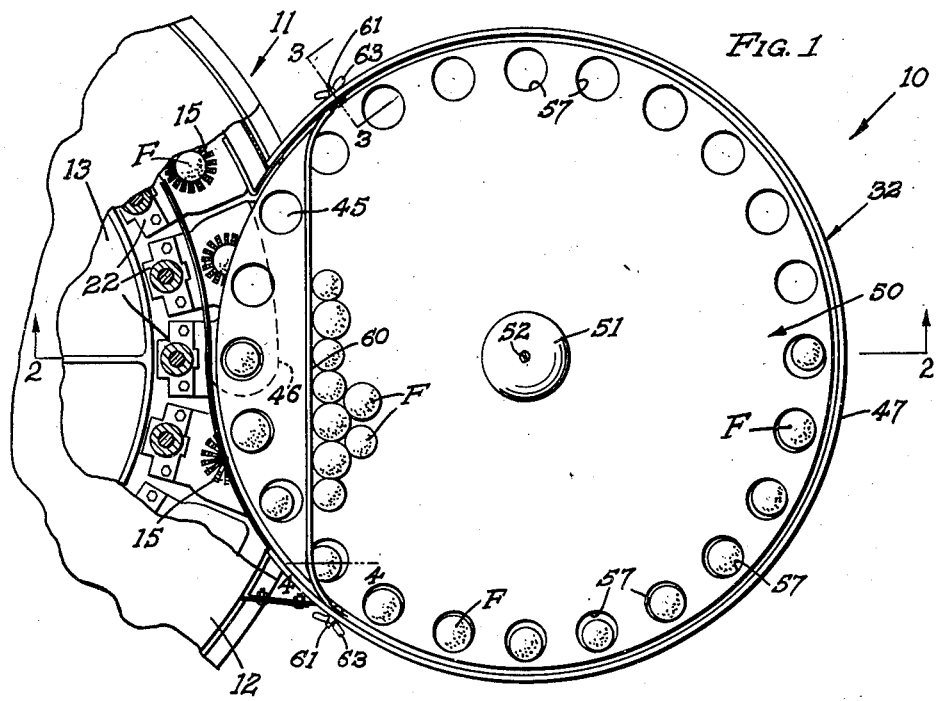
FIG. 1
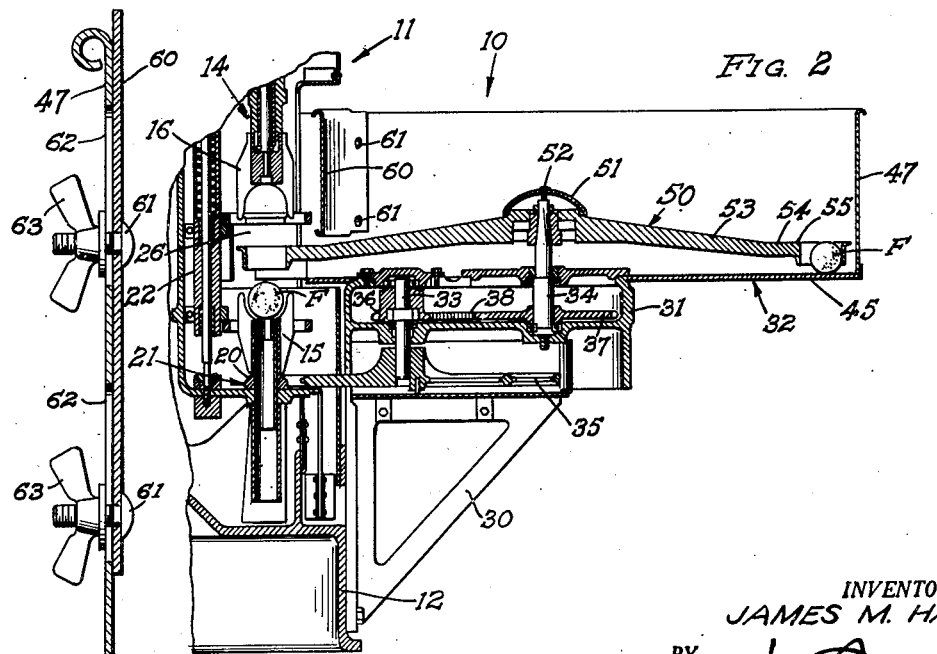
FIG. 2
FIG. 3
INVENTOR.
JAMES M. HAIT
BY
ATTORNEY

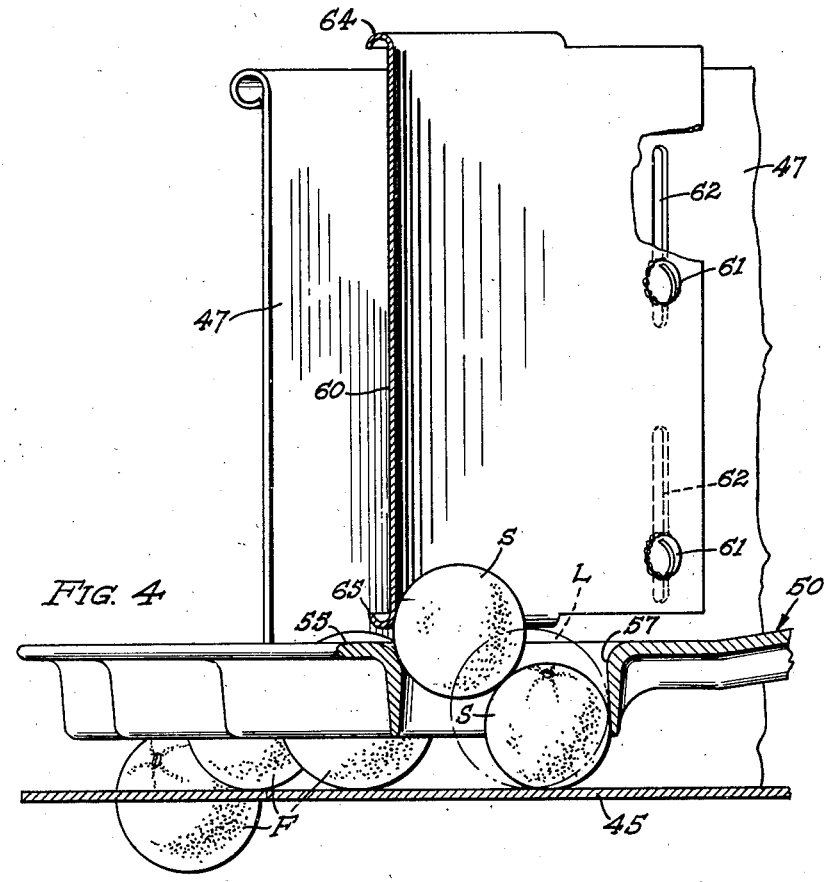
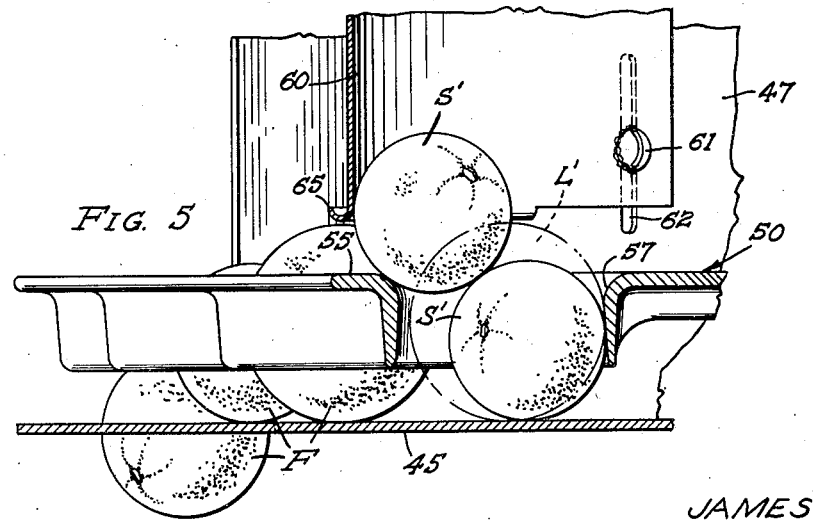

March 7, 1950 J. M. HAIT 2,500,030
SINGLE WHOLE FRUIT FEEDER
Filed May 28, 1947 3 Sheets-Sheet 3

INVENTOR.
JAMES M. HAIT
BY
ATTORNEY

Patented Mar. 7, 1950

2,500,030

UNITED STATES PATENT OFFICE 2,500,030

SINGLE WHOLE FRUIT FEEDER

James M. Hait, San Jose, Calif., assignor to Food Machinery and Chemical Corporation, a corporation of Delaware Application May 28, 1947, Serial No. 751,158

5 Claims. (Cl. 100—50)

This invention relates to an apparatus for feeding fresh whole fruit such as citrus fruit and the like singly from a mass of such fruit as is particularly useful in the feeding of citrus fruit to a rotary citrus juice extractor.

It is an object of this invention to provide a single whole fruit feeder adapted for rapidly separating single whole fresh fruit entities from a mass of these and feeding the fruit so separated singly and in a uniform continuous succession to a delivery point.

In a co-pending application of Wilbur A. Pipkin, Ser. No. 544,424, which issued on May 20, 1947, as U. S. Letters Patent No. 2,420,679, an extraction apparatus of the type above mentioned is disclosed.

The Pipkin type extractor is adapted to handle fruit varying in size within a range determined by the size of pairs of compression cups which are employed to compress the fruit for the extraction of juice therefrom. The fruit available for juice extraction processes generally consists of mixed sizes approximately of the same range as orchard-run and segregation of single pieces of fruit rapidly from a mass of mixed sizes and feeding them continuously in a close single file to an extractor presents numerous problems.

It is another object of the present invention to provide a single whole fruit feeder capable of handling masses of fruit varying in size over a wide range and segregating single entities from the mass and feeding these in a continuous file to a mechanism adapted to receive the same such as a Pipkin extractor.

A further object of the invention is to provide such a single whole fruit feeder which is adaptable to handling masses of fruit of mixed sizes in which the size range in one mass varies materially from the size range in another mass.

This invention is particularly useful in feeding fruit to the rotary juice extractor disclosed in the aforesaid Pipkin Patent, No. 2,420,679, and is adapted to be driven in harmony with, and feed fruit to, the rotor of said Pipkin extractor.

An improved rotary juice extractor of the Pipkin type is disclosed in the co-pending application of Werner R. Hofmann, Ser. No. 747,115 filed May 9, 1947, and the preferred embodiment of the present invention disclosed herein is designed to be mounted upon and driven in conjunction with the juice extractor shown in said co-pending application. Reference is had therefore to said patent and said application for the structural details of a rotary juice extractor to which the present invention is particularly adapted to feed fruit.

The manner of accomplishing the foregoing objects as well as further objects and advantages will be made manifest in the following description taken in connection with the accompanying drawings in which:

Fig. 1 is a plan view of a preferred embodiment of the invention.

Fig. 2 is a vertical sectional view taken on the line 2—2 of Fig. 1.

Fig. 3 is a vertical detailed sectional view taken on the line 3—3 of Fig. 1.

Fig. 4 is an enlarged detailed vertical sectional view taken on the line 4—4 of Fig. 1 and illustrating the operation of the invention when feeding a certain segregated group of sizes of fresh whole oranges.

Fig. 5 is a view similar to Fig. 4 illustrating the operation of the invention and feeding a different group of mixed sizes of fruit.

Figure 6:
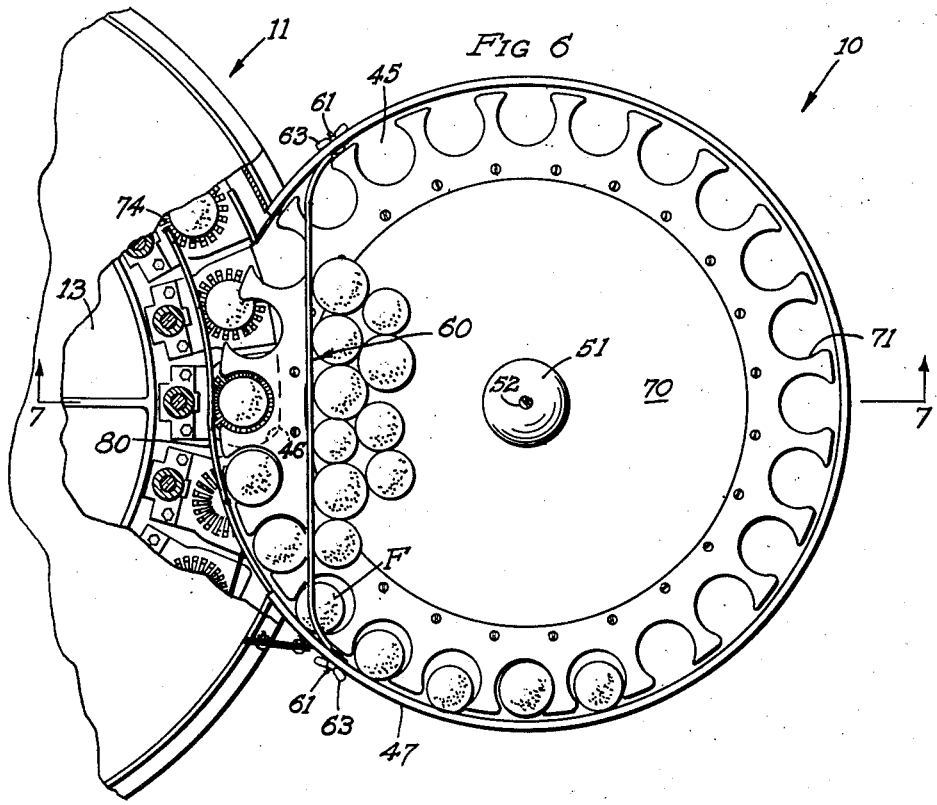
Fig. 6 is a plan view of a modified form of the invention.

Referring specifically to the drawings, the invention is there shown as embodied in a single whole fruit feeder 10 which is united with, driven by, and feeds fruit singly to a rotary juice extractor 11. The extractor 11 includes a frame 12 on which a juice extraction rotor 13 is rotatably mounted, this rotor having a series of extraction units 14. Each of these units has a lower cup 15 fixed on said rotor and an upper cup 16 which is reciprocated vertically as the rotor turns to compress a fruit and extract the juice therefrom. Although the mechanism for accomplishing this vertical reciprocation of the upper cup 17 of each of the extraction units 14 is not completely disclosed herein, it is to be understood that this mechanism may be similar to and follow the general principle of the corresponding mechanism disclosed in the above identified Pipkin patent.

There are twenty-four of the units 14 uniformly spaced circumferentially on the rotor 13 and the lower cup 15 of each unit provides a large gear tooth 20, these teeth being related to each other on the rotor 13 so as to constitute a gear 21.

Each extraction unit 14 has a stripper 22 which operates following each compression of a fruit to strip the carcass thereof from the cups 15 and 16.

Each unit 14 commences a cycle of operation with the upper and lower cups separated vertically by an empty space 26 and lower cup 15 at this moment is empty, ready to receive a fresh whole fruit entity. The point in the travel of each unit 14 at which the space 26 exists may be called the "point of delivery" at which fruit is fed thereto. Travelling away from this point, the unit performs its compression operation by the downward and upward reciprocation of the upper cup 16 at the conclusion of which the stripper 22 strips from the cup 15 the carcass of the fruit just compressed therein and permits this to be ejected by a plow (not shown) from the extractor 11 following which the stripper 22 clears the lower cup 15, whereby it is ready for receiving another piece of fruit as it arrives again at the delivery point.

The feeder 10 is supported on brackets 30 provided on the extractor frame 12 and includes a gear box 31 resting directly on and fixed to the brackets 30 and a hopper 32 which is fixed on the gear box 31. The gear box 31 provides suitable bearings in which are journalled vertical shafts 33 and 34. The first of these extends downwardly from the gear box 31 to carry fixed thereto, a large gear 35 which meshes with the gear 21 on the extractor rotor 13 so as to rotate the shaft 33 when the extractor is running. The latter shaft has a sprocket 36 and the shaft 34 has a sprocket 37, which sprockets are connected by a chain 38.

The shaft 34 extends upwardly out of the gear box 31 into the hopper 32.

The hopper 32 includes a circular, horizontal floor 45 which extends between the cups of the extraction units 14 just before they reach the point of delivery of fruit thereto. The floor 45 has a notch 46 formed therein which provides an opening for delivery of a piece of fruit through this floor into the cup 15 of each unit 14 when the latter arrives at the aforesaid point of delivery as illustrated in Fig. 2.

Extending upwardly from the outer edge of that portion of the floor 45 which is disposed outside of the extractor 11 is a side wall 47.

Fixed on an upper tapered end of the shaft 34 is a feed wheel 50 which is held in place by a cap 51, the latter being secured to the upper end of the shaft 34 by a screw 52.

The wheel 50 has an outwardly sloping disc 53, the peripheral portion 54 of which preferably has a horizontal upper surface 55. Provided in the peripheral wheel portion 54 is a series of fruit feeding holes 57 each of which is completely closed laterally but is open at the top and bottom. Each hole 57 preferably flares downwardly to prevent fruit hanging up by engaging opposite walls thereof when the time comes for the fruit to gravitate therefrom (see Figs. 4 and 5). The holes 57 are so located on the feed wheel 50 and the latter is so rotated in harmony with the rotor 13 by its driving connection with the latter, that the vertical axis of each unit 14, when the latter arrives at the aforesaid point of delivery of a fruit thereto, coincides with the axis of one of the holes 57 as clearly shown in Figs. 1 and 2.

Mounted at its opposite ends on inner ends of the wall 47 so that it may be adjustably fixed in vertical positions is a rigid shear board 60. The ends of this shear board are curved into tangency with the wall 47 and have bolts 61 welded thereto which extend through vertical slots 62 in the wall 47 to receive wing nuts 63, by manipulation of which, the vertical position in which the board 60 may be fixed on the wall 47 is adjustably determined.

The upper and lower edges of the shear board 60 are rendered rigid by curled flanges 64 and 65 bent outwardly therefrom. The shear board 60 subtends that segment of the peripheral wheel portion 54 which travels into the extractor 11.

*Operation*

As previously pointed out the principal problem in feeding fruit F singly to the cups 15 of the extractor 11 arises from the fact that this fruit is received in the form of an indiscriminate mixture of sizes. Sometimes these sizes vary over such a range that an extractor 11 with cups 15 and 16 of a given size is inadequate to handle all the sizes presented in the mixture of fruit which must be handled. It is then necessary to employ two extractors, one with one size of compression cups and the other with a different size. The mass of fruit to be handled is then divided into groups, by running it through a sizer, the group with the larger range of sizes being then fed to the extractor with the larger compression cups and the fruit with the smaller range of sizes being fed to the extractor with the smaller compression cups.

An advantage of the present invention is that it may be used to feed fruit of any particular range of sizes where the difference is not too great between the smallest and the largest fruit in the mixture. Almost invariably, the fruit is sized before it is fed to a Pipkin type extractor. The operator therefore knows the largest and smallest sizes in the mixture of fruit to be handled before he starts the run. In commercial practice, at the present time, Pipkin rotary extractors are made with cups of 3-inch diameter, 4¼-inch diameter and 6-inch diameter. The feed wheels 50 have holes 57 with diameters of 2 inches, 3 inches, 4¼ inches and 6 inches.

The feed wheel with 2-inch diameter holes is used for feeding very small fruit and lemons to the extractor with 3-inch cups. The feed wheel with 3-inch holes is used for feeding all but the very smallest sizes to the extractor with 3-inch cups. The feed wheel with 4¼-inch holes is used to feed fairly large oranges and small grapefruit to an extractor with 4¼-inch cups. The feed wheel with 6-inch holes is used to feed grapefruit exclusively to an extractor with 6-inch cups.

Figs. 1, 2, 3, 4 and 5 illustrate the invention as embodied in a feeder with the wheel having 3-inch holes and delivering fruit to an extractor with 3-inch compression cups.

Figs. 4 and 5 illustrate the difference in adjustment in the shear board 60 for handling mixtures of fruit sizes with different size ranges. Fig. 4 shows the adjustment necessary for handling a relatively small size range of fruit in which two of the smallest pieces of fruit S coming within this range are shown superimposed, one upon the other, in a single feeder hole 57. One of the largest pieces of fruit L in said mixture is shown in broken lines in Fig. 4 in the position it will assume when it occupies one of the feeder holes 57. In this figure, it is to be noted that the shear board 60 must be dropped down so that its lower edge is close to the upper surface 55 of the feeder wheel 50 in order to contact the uppermost of the two fruits S at a low enough point to remove this fruit from the hole 57 instead of simply smashing or cutting this piece of fruit in two. This point is preferably below the center of fruit S. The lower edge of the shear board 60, however, must be of sufficient elevation to clear a single piece of fruit of larger diameter L when the hole 57 is occupied by such a piece of fruit. This problem of handling a mixture of pieces of fruit varying in diameter requires careful adjustment of the shear board 60 to prevent cutting the uppermost of a pair of pieces of fruit when these occupy a hole 57 together (Fig. 4).

Fig. 5 illustrates the same feeder wheel 50 employed for handling a mixture of sizes in which the smallest and largest sizes are respectively greater in diameter than the smallest and largest sizes S and L illustrated in Fig. 4. The smallest size fruit within the range shown in Fig. 5 may be designated as S' and the largest size fruit, by a broken line, may be designated as L'. Fig. 5 illustrates the necessity of fixing the shear board 60 at a greater elevation than in Fig. 4 so as to clear a single fruit L' when one of these occupies the feeder hole 57, and at the same time the board must be low enough to contact the uppermost of two smaller pieces of fruit S' when these occupy a given hole together in the position in which these are shown in Fig. 5, at a low enough point to dislodge the uppermost fruit S' from the hole 57 rather than to compress and cut this.

It is thus seen that this invention provides a means to feed fresh whole fruit singly and in continuous succession from a mass of fruit of mixed sizes and a means for making the necessary adjustment to permit the same feeder to accommodate mixtures with different size ranges and practically eliminating the cutting or smashing of the fruit fed.

Figure 7:
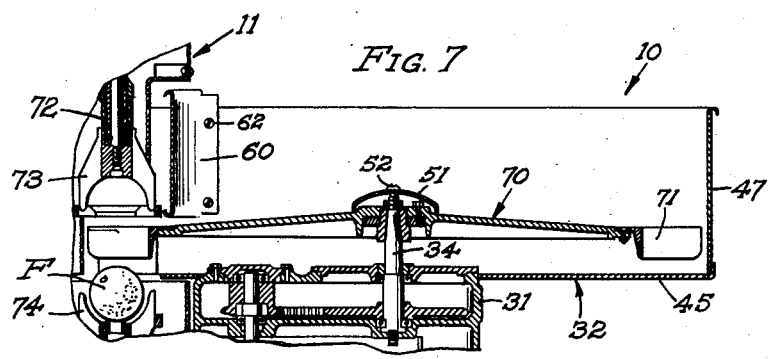
Fig. 7 is a vertical sectional view taken on the line 7—7 of Fig. 6.

Figs. 6 and 7 illustrate the invention with the feeder 10 equipped with a feed wheel 70 having feed holes 71 which are 4¼-inch in diameter, the feeder 10 here being associated with an extractor 11 having extraction units 72 with upper and lower cups 73 and 74 respectively, the interior of these cups being 4¼-inch in diameter. The feed holes 71 are open radially on account of there not being sufficient material (in view of the large size of the holes) to close the outer extremities of these holes and at the same time keep the radius of the wheel 70 within the necessary limits. The fruit F being fed by the wheel 70, however, are retained in their true path by a guide wall 80 which constitutes an extension of one end of the hopper wall 47 as clearly shown in Figs. 1 and 6.

The downward flaring or divergence of the walls of the feed holes which may be clearly seen in Figs. 4 and 5, is for the purpose of preventing any piece of fruit, and particularly a piece of fruit of maximum diameter, from hanging up in one of these holes when this hole arrives over the notch or delivery opening 46 formed in the floor 45.

As clearly shown in Figs. 1 and 6 the notch 46 in the floor 45 through which fruit entities gravitate downwardly into the lower compression cups, is shaped concentrically relative to the rotor 13 thereby freeing the fruit to drop in a fairly flat trajectory when operating at high speeds.

As may be noted, an end portion of the wall 80 is reversely curved concentrically with the rotor 13 so as to guide the fruit fed to the lower cups for a considerable distance after they drop from the feed holes 57. The fruit F are thus prevented from escaping past the compression cups and into the mechanism of the rotor 13.

It is to be further noted that the spacing of the lower surfaces of the feed wheels 50 or 70 from the floor 45 performs the important function of causing these surfaces to clear the upper extremities of large pieces of fruit fed from the holes 57 or 71 into the lower cups 15 or 74 when the portion of the wheel containing this hole swings out of vertical alignment with the cup this hole had been aligned with in order to feed said large fruit thereto.

It is necessary however, for the lower surfaces of the feeder wheels to be below the centers of the smallest pieces of fruit normally handled by the machine in order to prevent these smaller sized fruit entities being cut by the lower edges of the feed holes. To get the proper clearance between these lower wheel surfaces and the large pieces of fruit fed into the lower compression cups, it is necessary to locate the hopper floor 45 spaced somewhat above the level of the upper ends of the lower compression cups as clearly shown in Figs. 2 and 7.

The claims are:

1. In combination: a rotor; a series of citrus extractor units spaced circumferentially on said rotor, each unit including upper and lower whole fruit compression cups spaced vertically at a delivery point to receive a single whole fruit in said lower cup; means for vertically reciprocating one of said cups of each unit during the ensuing rotation of said rotor to compress said whole fruit between said cups and then restore the vertical space aforesaid between said cups; a circular floor extending between said cups as they approach their spaced relation aforesaid, said floor having a notch embracing the space between the cups of a unit as it arrives at said delivery point and is carried by said rotor away from said point; a wall surrounding the portion of said floor disposed outside said rotor to form a feed hopper; a feed wheel closely fitting within said wall and having a series of circumferentially spaced vertical single whole fruit feed holes adjacent the periphery thereof; means for rotating said wheel in timed relation with said rotor to bring successive units and holes substantially into vertical alignment at said delivery point to deliver a whole fruit from each hole through said notch and into the lower cup of the unit with which said hole was aligned; a shear board subtending the arc of the wheel segment extending between said cups; and means for adjustably varying the height of said shear board relative to said wheel according to the range of sizes in mixed-size fruit being handled by the machine.

2. A combination as in claim 1 in which said shear board has a rigid lower edge.

3. A combination as in claim 1 in which the bottom surfaces of said wheel at the lower ends of said holes are spaced upwardly from said hopper floor a distance in excess of half the radius of the smallest fruit normally handled by the machine and in which said hopper floor is spaced upwardly from said lower cups so that said bottom surfaces of said wheel will clear the upper extremity of the largest size fruit, which said machine is adapted to handle, when said largest fruit has been delivered from one of said holes into one of said lower cups.

4. A combination as in claim 1 in which a guide wall is provided which extends from one end of the hopper wall into the space between upper and lower cups of said units and behind said space to guide fruit delivered from said holes into said lower cups and to prevent said fruit escaping into said rotor past said cups.

5. In combination: a rotor; a series of extractor units spaced circumferentially on said rotor, each unit including upper and lower whole fruit compression cups spaced vertically at a delivery point to receive a single whole fruit in the lower cup of said unit; means for vertically reciprocating one of the aforesaid cups of each unit during the ensuing rotation of said rotor to compress said whole fruit between said cups and then restore the vertical space aforesaid between said cups; a floor extending into the space between said cups of each unit as said unit approaches said delivery point, said floor having a notch adjacent the space between the cups of said unit as said unit arrives at said delivery point and is carried by said rotor away from said point; a wall surrounding the portion of said floor disposed outside said rotor to form a feed hopper; a feed wheel disposed close to said floor and within said wall and having a series of circumferentially spaced vertical single whole fruit feed holes adjacent the periphery thereof; means for rotating said wheel in timed relation with said rotor to position said holes successively between the cups of said units at said delivery point so as to deliver a whole fruit from each of said holes through said notch and into the lower cup of the unit between the cups of which said hole is at that moment disposed; and a shearboard disposed close above said wheel and adjacent the arc of the wheel segment extending between said cups, said shearboard preventing the retention of more than a single piece of fruit in each of said holes as the latter travels therebeneath.

JAMES M. HAIT.

REFERENCES CITED

The following references are of record in the file of this patent:

UNITED STATES PATENTS

| Number | Name | Date |
|---|---|---|
| 725,921 | Baseman | Apr. 21, 1903 |
| 1,490,365 | DuGrenier | Apr. 15, 1924 |
| 1,718,385 | Sherwood | June 25, 1929 |
| 1,896,208 | Thompson et al. | Feb. 7, 1933 |
| 2,420,679 | Pipkin | May 20, 1947 |